United States Patent
Nishida et al.

(10) Patent No.: US 11,482,866 B2
(45) Date of Patent: Oct. 25, 2022

(54) CONTROL DEVICE, CONTROL METHOD, AND STORAGE MEDIUM FOR A MULTI-PURPOSE BATTERY

(71) Applicant: HONDA MOTOR CO., LTD., Tokyo (JP)

(72) Inventors: Yoshikazu Nishida, Wako (JP); Takamasa Mori, Tokyo (JP)

(73) Assignee: HONDA MOTOR CO., LTD., Tokyo (JP)

(*) Notice: Subject to any disclaimer, the term of this patent is extended or adjusted under 35 U.S.C. 154(b) by 143 days.

(21) Appl. No.: 16/991,066

(22) Filed: Aug. 12, 2020

(65) Prior Publication Data
US 2021/0057924 A1 Feb. 25, 2021

(30) Foreign Application Priority Data
Aug. 21, 2019 (JP) .............................. JP2019-151149

(51) Int. Cl.
  H02J 7/00 (2006.01)
  H01M 10/42 (2006.01)
  H01M 50/20 (2021.01)

(52) U.S. Cl.
  CPC ....... *H02J 7/00034* (2020.01); *H01M 10/425* (2013.01); *H01M 50/20* (2021.01); *H02J 7/0049* (2020.01); *H01M 2010/4278* (2013.01)

(58) Field of Classification Search
  CPC .. H02J 7/00034; H02J 7/0049; H02J 7/00032; H02J 7/0029; H02J 7/0047; H01M 10/425; H01M 2010/4278

(Continued)

(56) References Cited

U.S. PATENT DOCUMENTS

2004/0239502 A1* 12/2004 Yamauchi ........... H01M 50/576
                                              340/568.1
2010/0194568 A1*  8/2010 Irmscher ................ A47F 3/002
                                              340/568.3

(Continued)

FOREIGN PATENT DOCUMENTS

CN       206254962      6/2017
JP       2016-074372    5/2016

(Continued)

OTHER PUBLICATIONS

Machine translation of WO2018012082, 31 pages (Year: 2018).*
Japanese Notice of Allowance for Japanese Patent Application No. 2019-151149 dated Mar. 25, 2022.

*Primary Examiner* — Nathaniel R Pelton
(74) *Attorney, Agent, or Firm* — Amin, Turocy & Watson, LLP

(57) ABSTRACT

A control device includes a first acquisition unit configured to acquire geographical position information of a battery registered as being mounted in an electric power supply target, a second acquisition unit configured to acquire geographical position information of the electric power supply target having the battery mounted therein, a determination unit configured to determine whether a change has occurred in a relative relationship between the geographical position information of the battery acquired by the first acquisition unit and the geographical position information of the electric power supply target acquired by the second acquisition unit, and a coping unit configured to stop supply of power to the electric power supply target having the battery mounted therein in a case where it is determined by the determination unit that a change has occurred in the relative relationship.

8 Claims, 10 Drawing Sheets

(58) Field of Classification Search
USPC .......................................................... 320/100
See application file for complete search history.

(56) References Cited

U.S. PATENT DOCUMENTS

| | | | |
|---|---|---|---|
| 2012/0038473 A1* | 2/2012 | Fecher | B60L 58/24 |
| | | | 340/455 |
| 2012/0299721 A1* | 11/2012 | Jones | H04Q 9/00 |
| | | | 340/521 |
| 2013/0187617 A1* | 7/2013 | Tham | G08B 13/1409 |
| | | | 340/3.3 |
| 2019/0035237 A1 | 1/2019 | Kamer et al. | |
| 2019/0378390 A1* | 12/2019 | Bergqvist | H01M 10/4257 |
| 2021/0376396 A1* | 12/2021 | Burns | H04Q 9/00 |

FOREIGN PATENT DOCUMENTS

| | | | |
|---|---|---|---|
| JP | 2016-517257 | | 6/2016 |
| WO | 2014/138463 | | 9/2014 |
| WO | WO2018012082 | * | 1/2018 |

* cited by examiner

| BATTERY ID | POSITION INFORMATION |
|---|---|
| XXX-123-YYZR | (35° 10' 20.30"N<br>140° 40' 50.60"E) |

| ELECTRIC POWER SUPPLY TARGET | POSITION INFORMATION |
|---|---|
| VEHICLE M | (35° 10' 20.30"N<br>140° 40' 50.60"E) |

| BATTERY ID | USER | ELECTRIC POWER SUPPLY TARGET | APPROVAL STATUS | DETERMINATION RESULT | POSITION INFORMATION OF ELECTRIC POWER SUPPLY TARGET | MANAGEMENT CODE |
|---|---|---|---|---|---|---|
| XXX-123-YYZR | USER A | VEHICLE(M) | APPROVED | MATCH (IN USE) | (35° 10' 20.30"N 140° 40' 50.60"E) | ●●●-▼▼▼ |
| ... | ... | ... | ... | ... | ... | ... |

| BATTERY ID | USER | ELECTRIC POWER SUPPLY TARGET | APPROVAL STATUS | DETERMINATION RESULT | POSITION INFORMATION | MANAGEMENT CODE |
|---|---|---|---|---|---|---|
| XXX-123-YYZR | USER A | VEHICLE (M) | APPROVED | MATCH (IN USE) | (35° 10' 20.30"N 140° 40' 50.60"E) | ●●●–▼▼▼ |
| | | SCOOTER (OD1) | APPROVED | NOT MATCH | (37° 01' 23.4"N 137° 13' 45.67"E) | – |
| | | OUTDOOR CHARGER (OD2) | APPROVED | NOT MATCH | (35° 10' 20.30"N 140° 40' 50.60"E) | – |
| | | CART (OD3) | APPROVED | NOT MATCH | (37° 01' 23.4"N 137° 13' 45.67"E) | – |
| ⋮ | ⋮ | ⋮ | ⋮ | ⋮ | ⋮ | ⋮ |

CONTROL DEVICE, CONTROL METHOD, AND STORAGE MEDIUM FOR A MULTI-PURPOSE BATTERY

CROSS-REFERENCE TO RELATED APPLICATION

Priority is claimed on Japanese Patent Application No. 2019-151149, filed Aug. 21, 2019, the content of which is incorporated herein by reference.

BACKGROUND OF THE INVENTION

Field of the Invention

The present invention relates to a control device, a control method, and a storage medium.

Description of Related Art

Since the past, techniques relating to theft prevention of a battery of an electromotive vehicle have been disclosed (for example, Japanese Unexamined Patent Application, First Publication No. 2016-74372).

SUMMARY OF THE INVENTION

However, in the related art, removal of a battery by a user of an electromotive vehicle and multi-purpose use of the battery as power sources of devices other than the electromotive vehicle have not been fully considered.

The present invention was contrived in view of such circumstances, and one object thereof is to provide a control device, a control method, and a storage medium that make it possible to suitably manage a multi-purpose usable battery.

In order to solve the above problem and achieve such an object, the present invention adopts the following aspects.

(1) According to an aspect of the present invention, a control device is provided including: a first acquisition unit configured to acquire geographical position information of a battery registered as being mounted in an electric power supply target; a second acquisition unit configured to acquire geographical position information of the electric power supply target having the battery mounted therein; a determination unit configured to determine whether a change has occurred in a relative relationship between the geographical position information of the battery acquired by the first acquisition unit and the geographical position information of the electric power supply target acquired by the second acquisition unit; and a coping unit configured to stop supply of power to the electric power supply target having the battery mounted therein in a case where it is determined by the determination unit that a change has occurred in the relative relationship.

(2) In the aspect of the above (1), the control device may further include: a communication unit configured to communicate with an external device; a notification unit configured to notify a user of the electric power supply target in a case where it is determined by the determination unit that a change has occurred in the relative relationship; and a management unit configured to manage a combination of the battery and the electric power supply target to be determined by the determination unit and the electric power supply target. In a case where a user of the battery is changed, the management unit may accept a setting change for the user of the battery, and in a case where the setting change for the user of the battery is accepted by the management unit, the notification unit may notify at least a user of a new battery that the setting change is completed.

(3) In the aspect of the above (2), in a case where the management unit accepts the setting change for the user of the battery, and the coping unit stops supply of power to the electric power supply target having the battery mounted therein, the coping unit may release a stop state of supply of power to the electric power supply target having the battery mounted therein.

(4) In aspect of the above (2) or (3), the battery may be provided with a battery ECU configured to enable electric power supply stop control of the battery and be capable of communicating with the external device, and in a case where the management unit does not accept the setting change for the user of the battery, and it is determined by the determination unit that a change has occurred in the relative relationship, the coping unit may cause the communication unit to transmit a command for performing electric power supply stop control of the battery to the battery ECU.

(5) In the aspect of the above (4), in a case where the management unit accepts the setting change for the user of the battery, and transmits the command for performing electric power supply stop control of the battery to the battery ECU, the communication unit may transmit a command for releasing electric power supply stop control of the battery to the battery ECU.

(6) In any aspect of the above (1) to (4), in a case where the determination unit determines that a change has occurred in the relative relationship, and the battery is replaced from the electric power supply target to another device used by the user of the battery, the notification unit may notify the user of the electric power supply target that the battery is replaced.

(7) In any aspect of the above (1) to (6), in a case where the electric power supply target is a vehicle, the coping unit may stop the vehicle having the battery mounted therein in a case where it is determined by the determination unit that a change has occurred in the relative relationship.

(8) According to an aspect of the present invention, a control method is provided including causing a computer to: acquire geographical position information of a battery registered as being mounted in an electric power supply target; acquire geographical position information of the electric power supply target having the battery mounted therein; determine whether a change has occurred in a relative relationship between the geographical position information of the battery and the geographical position information of the electric power supply target; and stop supply of power to the electric power supply target having the battery mounted therein in a case where it is determined that a change has occurred in the relative relationship.

(9) According to an aspect of the present invention, a computer readable non-transitory storage medium is provided having a program stored therein, the program causing the computer to: acquire geographical position information of a battery registered as being mounted in an electric power supply target; acquire geographical position information of the electric power supply target having the battery mounted therein; determine whether a change has occurred in a relative relationship between the geographical position information of the battery and the geographical position information of the electric power supply target; and stop the electric power supply target having the battery mounted therein in a case where it is determined that a change has occurred in the relative relationship.

According to the aspects of the above (1) to (9), it is possible to suitably manage a multi-purpose usable battery.

BRIEF DESCRIPTION OF THE DRAWINGS

FIG. 6 is a diagram illustrating an example of management information.

FIG. 12 is a diagram illustrating another example of management information.

DETAILED DESCRIPTION OF THE INVENTION

Hereinafter, an embodiment of a control device, a control method, and a storage medium of the present invention will be described with reference to the accompanying drawings.

[Overall Configuration]

Figure 1:
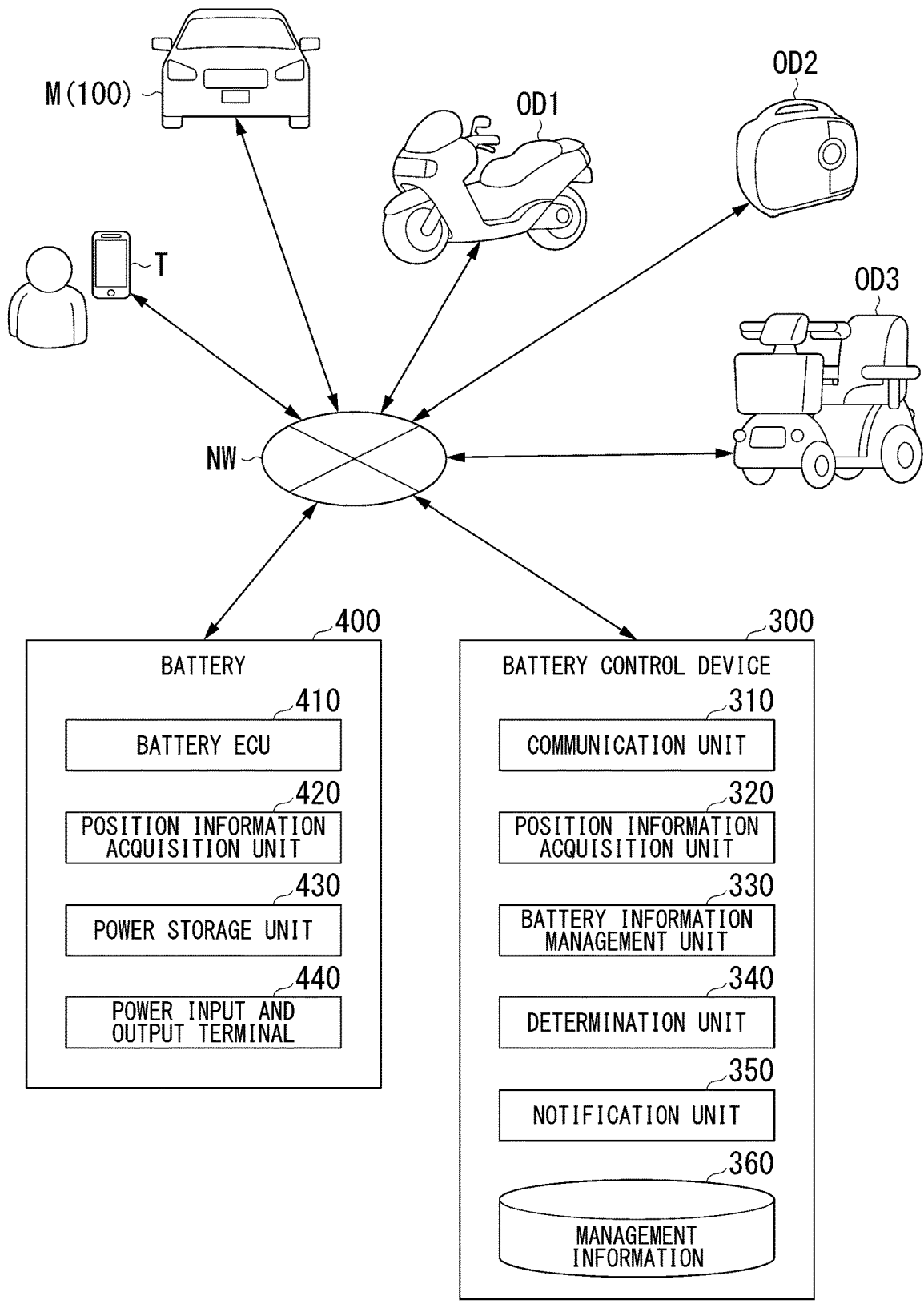
FIG. 1 is a diagram illustrating a usage environment of a battery control device.

FIG. 1 is a diagram illustrating a usage environment of a battery control device 300. For example, a vehicle M which is an electric power supply target having the battery control device 300 and a vehicle control device 100 mounted therein, a terminal device T used by a user of the vehicle M (which may hereinafter be referred to as a user A), a battery 400 capable of being mounted in the vehicle M, and other devices OD1 to OD3 capable of using the battery 400 can communicate with each other through a network NW. Examples of the network NW include a cellular network, a Wi-Fi network, Bluetooth (registered trademark), the Internet, a wide area network (WAN), a local area network (LAN), a public line, a provider device, a dedicated channel, wireless base station, and the like. The battery control device 300 may be mounted in the vehicle M, and manage the vehicle M and the battery 400. The battery control device 300 may comprehensively manage a plurality of vehicles M having the vehicle control device 100 mounted therein and the battery 400. The battery control device 300 is an example of a "control device." The terminal device T and each of other devices OD1 to OD3 are an example of an "external device."

The battery 400 may be individually possessed by a user, or may be shared with persons other than the user (a rental product in a sharing service).

The battery control device 300 includes a communication unit 310, a position information acquisition unit 320, a battery information management unit 330, a determination unit 340, a notification unit 350, and management information 360.

The communication unit 310 communicates with the vehicle M, other devices OD1 to OD3, or the like through the network NW. The position information acquisition unit 320 acquires geographical position information of a device that uses electric power supplied from the battery 400 of the vehicle M, other devices OD1 to OD3, or the like (hereinafter referred to as an electric power supply target). The position information acquisition unit 320 includes, for example, a global navigation satellite system (GNSS) reception device or a global positioning system (GPS) reception device. The position information acquisition unit 320 is an example of a "second acquisition unit."

The battery information management unit 330 manages information relating to the battery 400 and the vehicle M or other devices OD1 to OD3 that use the battery 400. The battery information management unit 330 performs control for permitting or stopping supply of electric power to an electric power supply target from the battery 400 on the basis of position information acquired by the position information acquisition unit 320 and position information of the battery 400 to be described later. The determination unit 340 determines whether the battery 400 is mounted in an electric power supply target which is assumed by a user of the vehicle M on the basis of, for example, the position information acquired by the position information acquisition unit 320 and the position information of the battery 400 to be described later.

In a case where it is determined by the determination unit 340 that the battery 400 is not mounted in an electric power supply target which is assumed by a user of the vehicle M through the battery information management unit 330, the notification unit 350 notifies the user of the effect.

Examples of the management information 360 to be stored include setting information, set in advance by the user of the battery 400, as to which electric power supply target the battery 400 is used in, position information for which the battery 400 is used, and a usage history as to which electric power supply target the battery 400 is connected to. In the management information 360, for example, information of a combination of information for identifying the battery 400 which is a target for determination (such as, for example, a battery ID for management) and the vehicle M is managed.

The battery 400 includes, for example, a battery electronic control unit (ECU) 410, a position information acquisition unit 420, and a power storage unit 430. The battery 400 is connected to a device which is a target that supplies electric power to the vehicle M, other devices OD1 to OD3, or the like through an electric power input and output terminal (not shown).

The battery ECU 410 can communicate with an external device such as the battery control device 300 or the terminal device T, and performs electric power supply and electric power supply stop control of the battery 400. The position information acquisition unit 420 acquires geographical position information of the battery 400. The position information acquisition unit 420 includes, for example, a GNSS reception device or a GPS reception device. The position information acquisition unit 420 is an example of a "first acquisition unit."

The power storage unit 430 accumulates electric power introduced from an external charger of the vehicle M, and performs discharge for traveling of the vehicle M or discharge for operation of other devices OD1 to OD3.

Figure 2:
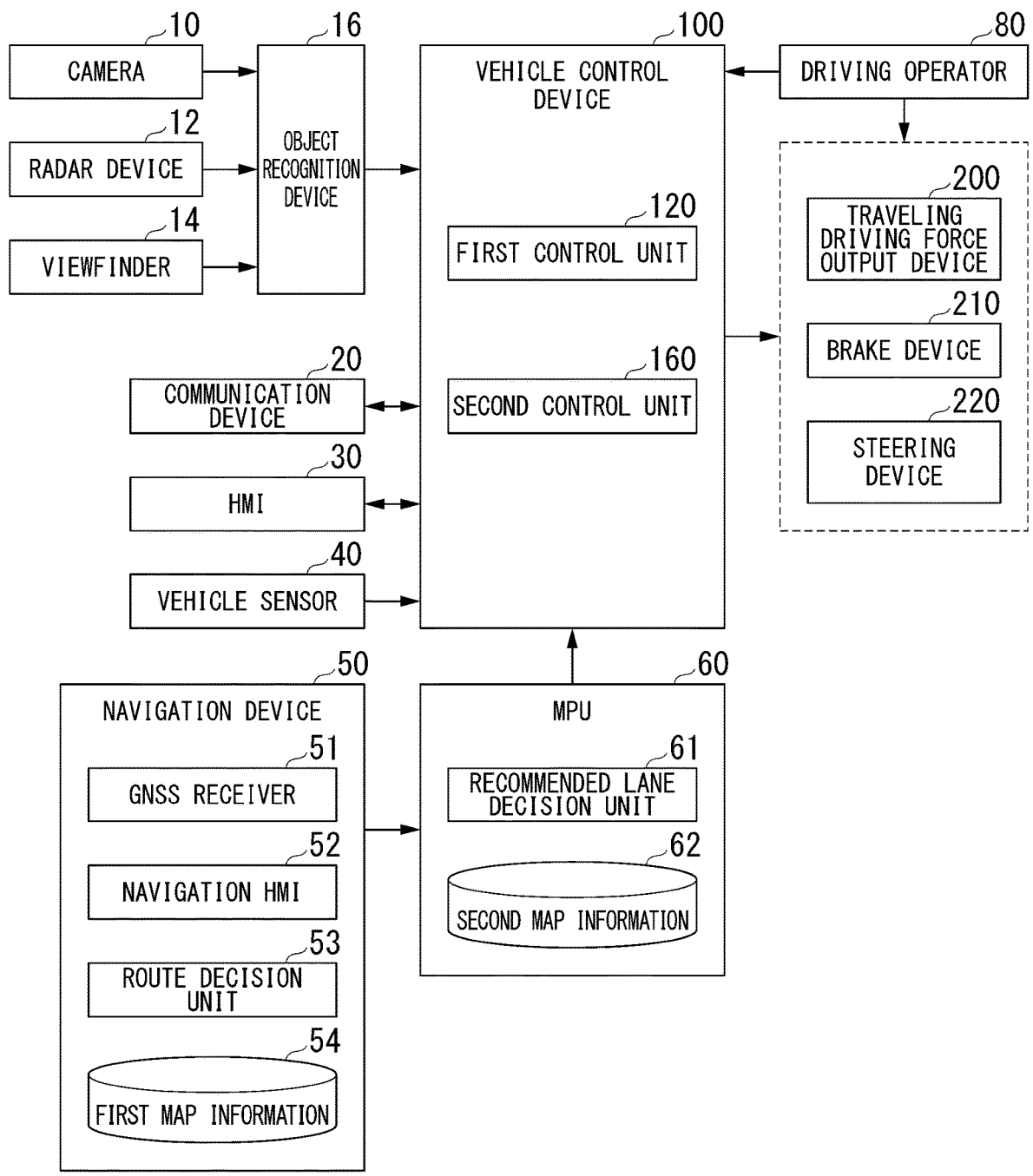
FIG. 2 is a configuration diagram of a vehicle system using a vehicle control device of a first embodiment.

FIG. 2 is a configuration diagram of a vehicle system 1 in which the vehicle control device 100 of the first embodiment is used. A vehicle having the vehicle system 1 mounted therein is, for example, a two-wheeled, three-wheeled, or four-wheeled vehicle or the like, and the driving source thereof is an electric motor, or a combination of an internal-combustion engine such as a diesel engine or a gasoline engine and the electric motor. The electric motor operates using power generated by a generator connected to an internal-combustion engine or discharging power of a secondary battery or a fuel cell.

The vehicle control device 100 of the embodiment is applied to an automated driving vehicle. The term "automated driving" refers to, for example, controlling both the steering and acceleration or deceleration of a vehicle and executing driving control. The vehicle control device of the embodiment may be applied to a vehicle that performs driving assistance such as an adaptive cruise control system (ACC) or a lane keeping assistance system (LKAS).

The vehicle system 1 includes, for example, a camera 10, a radar device 12, a viewfinder 14, an object recognition device 16, a driving operator 80, the vehicle control device 100, a traveling drive force output device 200, a brake device 210, and a steering device 220. These devices or instruments are connected to each other through a multiplex communication line such as a controller area network (CAN) communication line, a serial communication line, a wireless communication network, or the like. The configuration shown in FIG. 2 is merely an example, and portions of the configuration may be omitted, or other configurations may be further added thereto.

The camera 10 is a digital camera using a solid-state imaging element such as, for example, a charge coupled device (CCD) or a complementary metal oxide semiconductor (CMOS). The camera 10 is installed at any points on a vehicle having the vehicle system 1 mounted therein. In a case where a forward image is captured, the camera 10 is installed on the upper portion of the front windshield, the rear surface of the rear-view mirror, or the like. The camera 10, for example, repeatedly captures an image of the vicinity of the vehicle M periodically. The camera 10 may be a stereo camera.

The radar device 12 radiates radio waves such as millimeter waves to the vicinity of the vehicle M, and detects radio waves (reflected waves) reflected from an object to detect at least the position (distance to and orientation of) of the object. The radar device 12 is installed at any point of the vehicle M. The radar device 12 may detect the position and speed of an object with a frequency modulated continuous wave (FM-CW) system.

The viewfinder 14 is a light detection and ranging (LIDAR) viewfinder. The viewfinder 14 irradiates the vicinity of the vehicle M with light, and measures scattered light. The viewfinder 14 detects a distance to an object on the basis of a time from light emission to light reception. The irradiation light is, for example, pulsed laser light. The viewfinder 14 is installed at any point on the vehicle M.

The object recognition device 16 recognizes the position, type, speed, or the like of an object by performing a sensor fusion process on detection results based on some or all of the camera 10, the radar device 12, and the viewfinder 14. The object recognition device 16 outputs recognition result to the vehicle control device 100. The object recognition device 16 may output the detection results of the camera 10, the radar device 12, and the viewfinder 14, as they are, to the vehicle control device 100. The object recognition device 16 may be omitted from the vehicle system 1.

A communication device 20 communicates the other vehicle which is present in the vicinity of the automated driving vehicle using, for example, a cellular network, a Wi-Fi network, Bluetooth (registered trademark), dedicated short range communication (DSRC), or the like, or communicates with various types of server devices that provide traffic information (for example, setting information of a priority route or priority lane based on road traffic congestion information, traffic volume adjustment, emergency vehicle passage, or the like) or the like through a wireless base station.

A HMI 30 provides various types of information for an occupant of the automated driving vehicle, and accepts the occupant's input operation. The HMI 30 includes various types of display devices, a speaker, a buzzer, a touch panel, a switch, a key, and the like.

A vehicle sensor 40 includes a vehicle speed sensor that detects the speed of the automated driving vehicle, an acceleration sensor that detects an acceleration, a yaw rate sensor that detects an angular velocity around a vertical axis, an orientation sensor that detects the direction of the automated driving vehicle, or the like.

A navigation device 50 includes, for example, a GNSS receiver 51, a navigation HMI 52, and a route decision unit 53. The navigation device 50 holds first map information 54 in a storage device such as an HDD or a flash memory. The GNSS receiver 51 specifies the position of the automated driving vehicle on the basis of a signal received from a GNSS satellite. The position of the automated driving vehicle may be specified or complemented by an inertial navigation system (INS) in which an output of the vehicle sensor 40 is used. The navigation HMI 52 includes a display device, a speaker, a touch panel, a key, and the like. A portion or the entirety of the navigation HMI 52 may be shared with the above-described HMI 30. The route decision unit 53 decides, for example, a route (hereinafter referred to as a route on a map) from the position (or any input position) of the automated driving vehicle specified by the GNSS receiver 51 to a destination input by an occupant using the navigation HMI 52 with reference to the first map information 54. The first map information 54 is, for example, information in which a road shape is represented by a link indicating a road and nodes connected by the link. The first map information 54 may include the curvature of a road, point of interest (POI) information, or the like. The route on a map is output to the MPU 60. The navigation device 50 may perform route guidance using the navigation HMI 52 on the basis of the route on a map. The navigation device 50 may be realized by the function of a terminal device such as, for example, a smartphone or a tablet terminal possessed by an occupant. The navigation device 50 may transmit its current position and destination to a navigation server through the communication device 20, and acquire the same route as the route on a map from the navigation server.

The MPU 60 includes, for example, a recommended lane decision unit 61, and holds second map information 62 in a storage device such as an HDD or a flash memory. The recommended lane decision unit 61 divides the route on a map provided from the navigation device 50 into a plurality of blocks (for example, divides the route on a map every 100 [m] in a vehicle traveling direction), and decides a recommended lane for each block with reference to the second map information 62. The recommended lane decision unit 61 makes a decision on which lane from the left to travel along. In a case where a branch point is present in the route on a map, the recommended lane decision unit 61 decides a recommended lane so that the automated driving vehicle can travel along a rational route for advancing to a branch destination.

The second map information 62 is map information having a higher accuracy than that of the first map information 54. The second map information 62 includes, for example, information of the center of a lane, information of the boundary of a lane, or the like. The second map information 62 may include road information, traffic regulations information, address information (address or zip code), facility information, telephone number information, or the like. The second map information 62 may be updated when necessary by the communication device 20 communicating with another device.

The driving operator 80 includes, for example, an accelerator pedal, a brake pedal, a shift lever, a steering wheel, a variant steering wheel, a joystick, and other operators. A sensor that detects the amount of operation or the presence or absence of operation is installed on the driving operator 80, and the detection results are output to the vehicle control device 100, or some or all of the traveling driving force output device 200, the brake device 210, and the steering device 220.

The vehicle control device 100 includes, for example, a first control unit 120 and a second control unit 160. The first control unit 120 and the second control unit 160 are realized by a hardware processor such as, for example, a CPU executing a program (software). Some or all of these components may be realized by hardware (a circuit unit; including circuitry) such as an LSI, an ASIC, an FPGA, or a GPU, or may be realized by software and hardware in cooperation. The program may be stored in a storage device such as an HDD or a flash memory (a storage device including a non-transitory storage medium) of the vehicle control device 100 in advance, may be stored in a detachable storage medium such as a DVD or a CD-ROM, or may be installed in the HDD or the flash memory of the vehicle control device 100 by the storage medium (the non-transitory storage medium) being mounted in a drive device.

Figures 3, 4, 5:
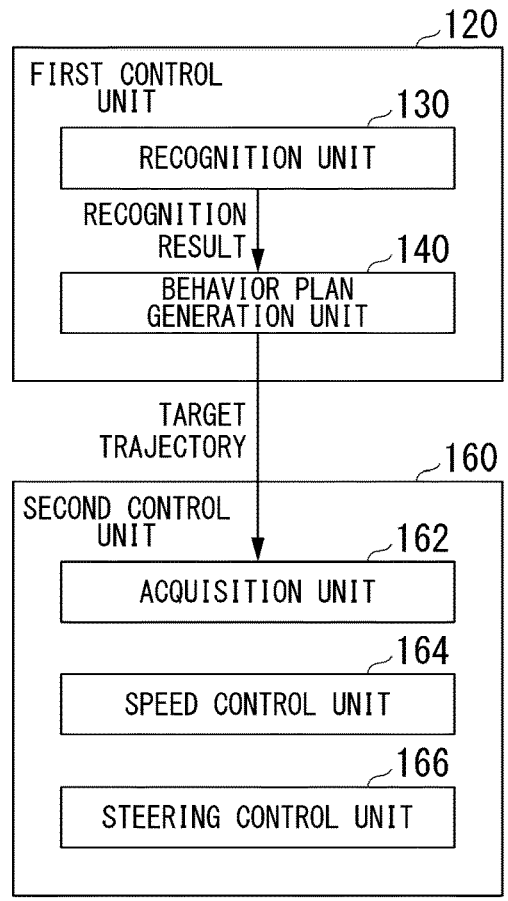
FIG. 3 is a functional configuration diagram of a first control unit and a second control unit.
FIG. 4 is a diagram illustrating an example of position information of a battery acquired by a position information acquisition unit.
FIG. 5 is a diagram illustrating an example of position information of an electric power supply target acquired by the position information acquisition unit.

FIG. 3 is a functional configuration diagram of the first control unit 120 and the second control unit 160. The first control unit 120 includes, for example, a recognition unit 130 and a behavior plan generation unit 140. The first control unit 120 concurrently realizes, for example, a function based on artificial intelligence (AI) and a function based on a model imparted in advance. For example, a function of "recognizing a point of intersection" may be realized by the recognition of a point of intersection based on deep leaning or the like and recognition based on conditions (such as a signal or a road sign on which pattern matching is possible) imparted in advance being concurrently executed, and being comprehensively evaluated by performing scoring on both. Thereby, the reliability of automated driving is secured. A unit having both the functions of the first control unit 120 and the second control unit 160 is an example of a "coping unit."

The recognition unit 130 recognizes the vicinity of the vehicle M, and estimates the behavior of a recognized target. The recognition unit 130 recognizes the position of an object near the automated driving vehicle (such as a preceding vehicle, an opposing vehicle, or a main line vehicle that travels on the main line of a merging road) and the state of its speed, acceleration or the like on the basis of information which is input from the camera 10, the radar device 12, and the viewfinder 14 through the object recognition device 16. The position of the object is recognized as, for example, a position in absolute coordinates with a representative point (such as the centroid or the center of a drive shaft) of the automated driving vehicle as an origin, and is used in control. The position of the object may be represented by a representative point such as the centroid or a corner of the object, or may be represented by a representative region. The "state" of the object may include the acceleration or jerk of the object, or a "behavior state" (for example, whether a preceding vehicle of the vehicle M is performing or attempting to perform a lane change).

Upon recognizing a traveling lane, the recognition unit 130 recognizes the position or posture of the automated driving vehicle with respect to the traveling lane. The recognition unit 130 may recognize, for example, deviation of the automated driving vehicle from the center of the lane which is a reference point, and an angle formed with respect to a line aligned along the center of the lane of the automated driving vehicle in its traveling direction, as the relative position and posture of the automated driving vehicle with respect to the traveling lane. Instead, the recognition unit 130 may recognize the position of the reference point of the automated driving vehicle or the like with respect to either lateral end portion (a road partition line or a road boundary) of the traveling lane, as the relative position of the automated driving vehicle with respect to the traveling lane.

The recognition unit 130 recognizes, for example, a lane (traveling lane) in which the automated driving vehicle is traveling. For example, the recognition unit 130 recognizes a traveling lane by comparing a pattern of a road partition line (for example, an array of solid lines and broken lines) obtained from the second map information 62 with a pattern of a road partition line located in the vicinity of the automated driving vehicle which is recognized from an image captured by the camera 10. The recognition unit 130 may recognize a traveling lane by recognizing a driving boundary (road boundary) including a road partition line, a shoulder, a curbstone, a median strip, a guardrail, or the like without being limited to the recognition of a road partition line. In this recognition, the position of the automated driving vehicle acquired from the navigation device 50 or processing results based on an INS may be added. The recognition unit 130 recognizes a stop line, a signal, and other road events.

The recognition unit 130 recognizes information relating to a roadway in which a nearby vehicle, particularly, the vehicle M is scheduled to travel on the basis of a nearby vehicle of the vehicle M recognized from an image captured by the camera 10, and an image captured by the camera 10, traffic congestion information around the vehicle M acquired by the navigation device 50, or position information obtained from the second map information 62. The information relating to a roadway in which a vehicle is scheduled to travel includes, for example, the width of a lane (the width of a roadway) in which the vehicle M is scheduled to travel, or the like.

The behavior plan generation unit 140 generates a target trajectory along which the vehicle M will travel in the future so that the host vehicle travels in a recommended lane determined by the recommended lane determiner 61 in principle and automated driving coping with the peripheral situation of the vehicle M is executed. The target trajectory includes, for example, a speed element. For example, the target trajectory is represented as a trajectory obtained by arranging points (trajectory points) at which the vehicle M will arrive in order. The trajectory points are points at which the vehicle M will arrive after predetermined traveling distances (for example, approximately every several [m]) which are distances along a road. Separately from the trajectory points, a target speed and a target acceleration for each predetermined sampling time (for example, approximately several tenths of a [sec]) are generated as a portion of the target trajectory.

The behavior plan generation unit 140 may set automated driving events when generating a target trajectory. Examples of automated driving events include a constant-speed traveling event, a low-speed following traveling event, a lane change event, a divergence event, a contact avoidance event, a merging event, an emergency stop event, and the like. The merging event is, for example, an event of causing the vehicle M to merge into a main line at a merging point having no signal or stop line on an expressway or the like. The behavior plan generation unit 140 generates a target trajectory according to a started event. The emergency stop event is, for example, an event of causing the vehicle M to stop at a shoulder, a parking lot, or a temporarily stoppable area such as a service area and enter a standby state at the time of physical deconditioning of an occupant of the vehicle M, a theft of the vehicle M, or the like.

The second control unit 160 controls the traveling driving force output device 200, the brake device 210, and the steering device 220 so that the automated driving vehicle passes along the target trajectory generated by the behavior plan generation unit 140 according to scheduled times.

Referring back to FIG. 2, the second control unit 160 includes, for example, an acquisition unit 162, a speed control unit 164, and a steering control unit 166. The acquisition unit 162 acquires information of the target trajectory (trajectory point) generated by the behavior plan generation unit 140, and stores the acquired information in a memory (not shown). The speed control unit 164 controls the traveling driving force output device 200 or the brake device 210 on the basis of a speed element associated with the target trajectory stored in the memory. The steering control unit 166 controls the steering device 220 in accordance with the bent state of the target trajectory stored in the memory. The processes of the speed control unit 164 and the steering control unit 166 are realized by, for example, a combination of feedforward control and feedback control. As an example, the steering control unit 166 executes a combination of feedforward control according to the curvature of a road in front of the automated driving vehicle and feedback control based on deviation from the target trajectory.

The traveling driving force output device 200 outputs a traveling driving force (torque) for a vehicle to travel to a driving wheel. The traveling driving force output device 200 includes, for example, a combination of an internal-combustion engine, an electric motor, a transmission or the like, and an ECU that controls these components. The ECU controls the above components in accordance with information which is input from the second control unit 160 or information which is input from the driving operator 80.

The brake device 210 includes, for example, a brake caliper, a cylinder that transfers hydraulic pressure to the brake caliper, an electric motor that generates hydraulic pressure in the cylinder, and a brake ECU. The brake ECU controls the electric motor in accordance with the information which is input from the second control unit 160 or the information which is input from the driving operator 80, and causes a brake torque according to a braking operation to be output to each wheel. The brake device 210 may include a mechanism that transfers hydraulic pressure generated by the operation of a brake pedal included in the driving operator 80 through a master cylinder to the cylinder as a backup. The brake device 210 is not limited to the above-described configuration, and may be an electronic control type hydraulic brake device that controls an actuator in accordance with the information which is input from the second control unit 160 and transfers hydraulic pressure of the master cylinder to the cylinder.

The steering device 220 includes, for example, a steering ECU and an electric motor. The electric motor changes the direction of a turning wheel, for example, by causing a force to act on a rack and pinion mechanism. The steering ECU drives the electric motor in accordance with the information which is input from the second control unit 160 or the information which is input from the driving operator 80, and changes the direction of the turning wheel.

[Function of Battery Control Device]

Hereinafter, the details of the function of the battery control device 300 will be described.

FIG. 4 is a diagram illustrating an example of position information of the battery 400 acquired by the position information acquisition unit 420. The battery 400 is allocated a battery ID that makes it possible to identify each battery housing. The position information of the battery 400 acquired by the position information acquisition unit 420 is transmitted to the battery control device 300 along with the battery ID of the battery 400.

FIG. 5 is a diagram illustrating an example of position information of an electric power supply target acquired by the position information acquisition unit 320. In a case where the electric power supply target is the vehicle M, the position information acquisition unit 320 acquires geographical position information of the vehicle M, for example, by transmitting the reception result of the GNSS receiver 51 of the navigation device 50 through the communication device 20.

FIG. 6 is a diagram illustrating an example of the management information 360. The management information 360 includes a battery ID of the battery 400, a user of the battery 400, an electric power supply target of the battery 400, an approval status (status information indicating whether the user of the battery 400 performs a setting of which electric power supply target the battery 400 is installed at, or the like), a management code, or the like. In the following description, the approval status of the management information 360 is set to "approved" in a case where the user of the battery 400 performs a setting of which electric power supply target the battery 400 is installed at, and the approval status of the management information 360 is set to "unapproved" in a case where a setting of which electric power supply target the battery 400 is installed at is not performed. The management code is, for example, a code which is uniquely set with respect to a combination of an electric power supply target and the battery 400 in which the approval status of the management information 360 is set to "approved."

The battery information management unit 330 determines whether the battery 400 is mounted in an electric power supply target assumed by the user of the vehicle M, for example, on the basis of the position information of the battery 400 acquired by the position information acquisition unit 420 shown in FIG. 4 and the position information of the vehicle M acquired by the position information acquisition unit 320 shown in FIG. 5. In the above example, since the position information of the vehicle M and the position information of the battery 400 match, it is determined that the battery 400 is mounted in the vehicle M which is an electric power supply target assumed by the user of the vehicle M. The battery information management unit 330 may store the result of determination of whether the battery 400 is mounted in an electric power supply target assumed by the user of the vehicle M or position information of the electric power supply target, for example, as shown in FIG. 6, in the management information 360.

Since the battery 400 and an electric power supply target are installed and used at positions apart from each other in some cases, the position information does not necessarily match. For this reason, the battery information management unit 330 stores, for example, a relationship between relative positions of the battery 400 and an electric power supply target in the management information 360, acquires the position information of the battery 400 and an electric power supply target after the elapse of a certain period of time, and determines whether the relative positions change. In a case where the relative positions do not change, the battery information management unit 330 determines that the battery 400 is mounted in an electric power supply target assumed by the user of the vehicle M. In a case where the relative positions change, the battery information management unit 330 determines that the battery 400 is not mounted in an electric power supply target assumed by the user of the vehicle M.

The battery information management unit 330 may determine whether the battery 400 is mounted in the vehicle M using another method, in addition to the absence of a change in the relationship between the relative positions of the vehicle M and the battery 400. For example, the battery information management unit 330 determines that the battery 400 is mounted in the vehicle M in a case where the communication device 20 of the vehicle M and the battery ECU 410 of the battery 400 can communicate with each other in a wired manner or in a narrow-band wireless manner such as Bluetooth (registered trademark), in addition to the absence of a change in the relationship between the relative positions of the vehicle M and the battery 400, and determines that the battery 400 is not mounted the vehicle M in a case where the relationship between the relative positions changes and the above communication is interrupted.

[Change of Electric Power Supply Target]

Figure 7:
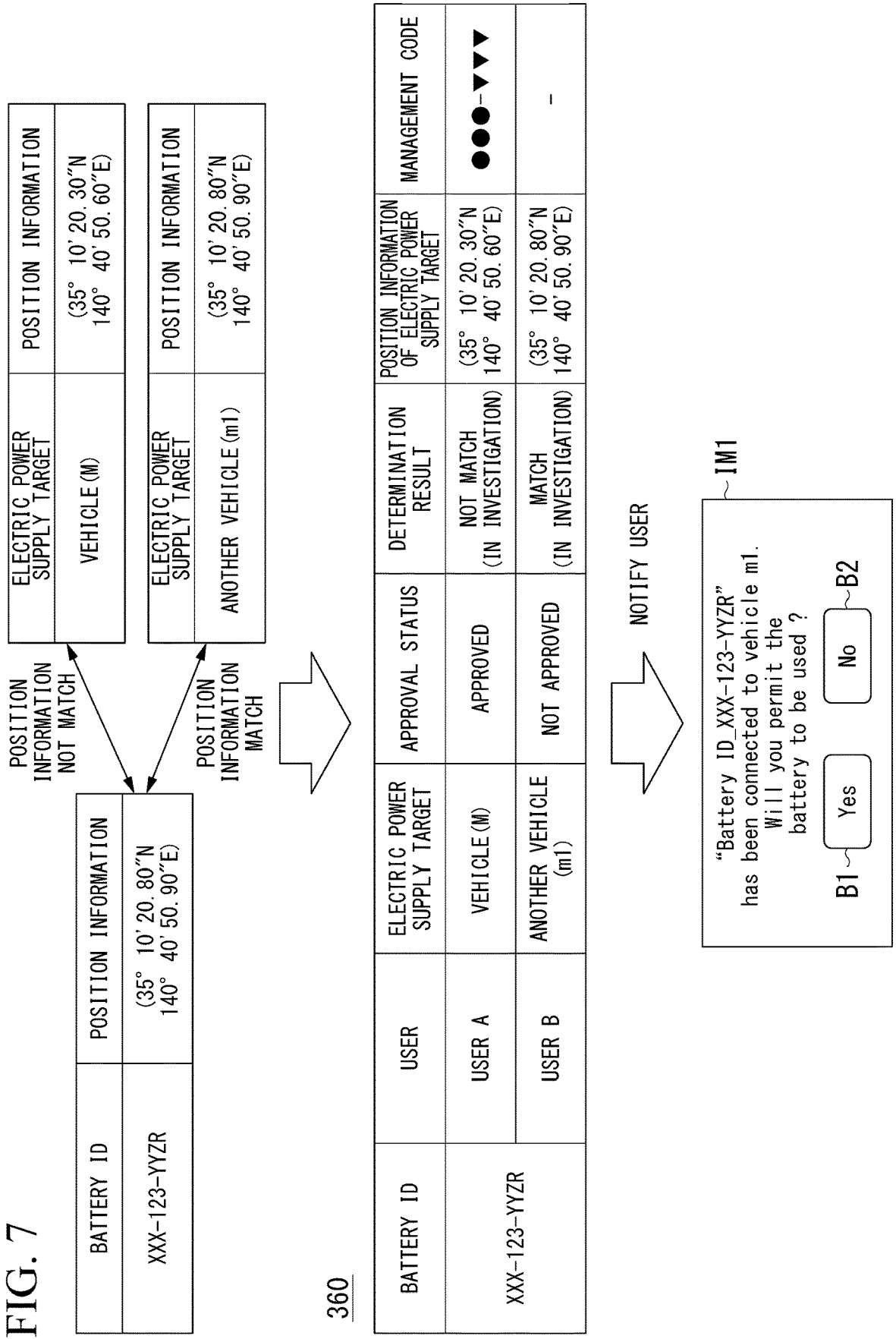
FIG. 7 is a diagram illustrating processing of the battery control device during a change of the electric power supply target.

FIG. 7 is a diagram illustrating processing of the battery control device 300 during a change of an electric power supply target.

The battery information management unit 330 determines whether the battery 400 is mounted in an electric power supply target assumed by the user of the vehicle M on the basis of, for example, the position information of the battery 400 acquired by the position information acquisition unit 420 and the position information of the vehicle M acquired by the position information acquisition unit 320 which are shown in the upper diagram of FIG. 7. In the shown example, since the position information of the battery 400 and the position information of the vehicle M do not match, the battery information management unit 330 determines that the battery 400 is not mounted in an electric power supply target assumed by the user of the vehicle M.

The battery information management unit 330 may search for an electric power supply target having position information that matches the position information of the battery 400. For example, the battery information management unit 330 refers to the management information 360 with respect to the other vehicle m1 acquired by the position information acquisition unit 320 which has position information that matches the position information of the battery 400 acquired by the position information acquisition unit 420 shown in the upper diagram of FIG. 7. Hereinafter, a user of the other vehicle m1 is referred to as a user B.

Since the result of referring to the management information 360 indicates that the approval status of the battery 400 having a battery ID "XXX-123-YYZR" for the other vehicle m1 is set to "unapproved," the determination unit 340 decides that the user A is notified of the effect by the notification unit 350.

The notification unit 350 notifies the user A that the battery 400 is not mounted in the vehicle M. Information of a notification performed by the notification unit 350 is displayed on the display unit of a terminal device used by the user A (hereinafter referred to as a terminal device TA), for example, in a form such as an image IM1 shown in the lower diagram of FIG. 7. For example, in a case where the user A transfers or temporarily lends the battery 400 to the user B, the user A permits the other vehicle m1 to continue to use the battery 400 by pressing a "YES" button B1 in the image IM1.

On the other hand, in a case where the battery 400 is unintentionally mounted in the other vehicle m1 of the user B, the user A does not permit the other vehicle m1 to use the battery 400 by pressing a "NO" button B2 in the image IM1. In that case, the battery information management unit 330 transmits a stop command through the communication unit 310 so as to cause the vehicle control device 100 of the other vehicle m1 to start an emergency stop event of stopping the other vehicle m1. The battery information management unit 330 may transmit a discharge stop signal for stopping electric power supply to the battery 400 along with the stop command of the other vehicle m1.

It is preferable that the battery information management unit 330 can release the stop state of the other vehicle m1 by terminating (or stopping) an emergency stop event in consideration of a user's erroneous input or erroneous operation, an input delay, or the like, or transmit a discharge restart signal for restarting electric power supply to the battery 400.

[Setting Change for User or Electric Power Supply Target]

Figure 8:
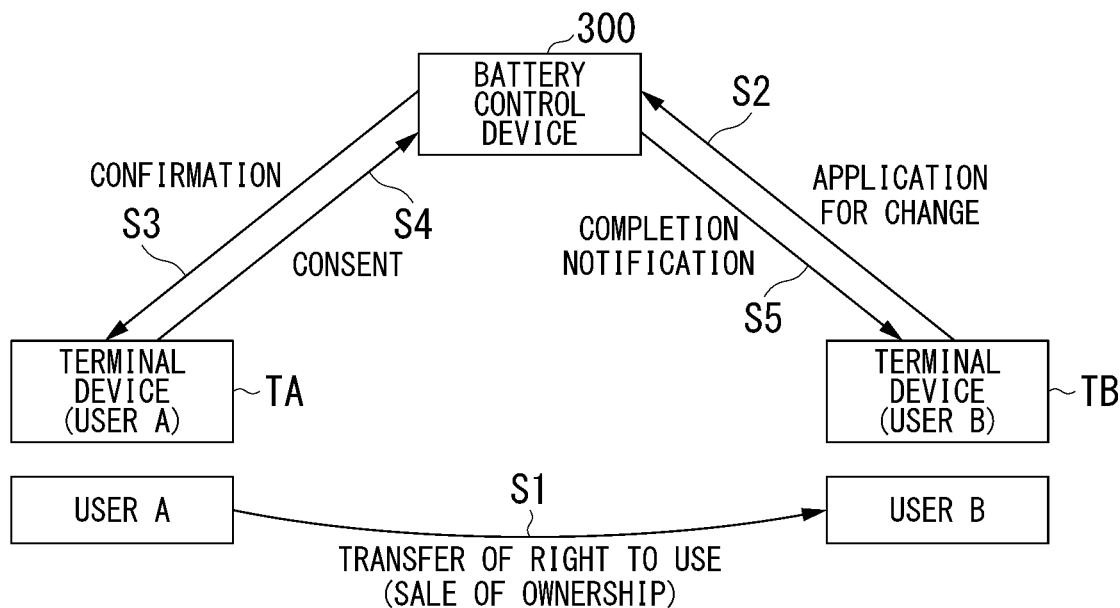
FIG. 8 is a diagram illustrating a flow of processing in a case where the battery control device accepts a setting change for a user or electric power supply target.

The battery control device 300 may accept a setting change for the user of the battery 400 or the electric power supply target by the user A or the user B in advance. FIG. 8 is a diagram illustrating a flow of processing in a case where the battery control device 300 accepts a setting change for a user or electric power supply target.

Figure 9:
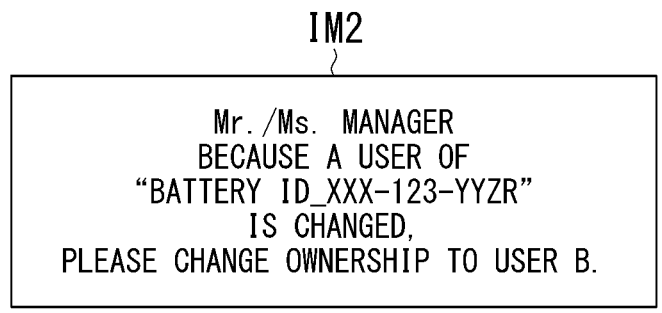
FIG. 9 is an example of content of an application for a change of the user or electric power supply target of a battery.

For example, it is assumed that transfer of a right to use the battery 400 (such as sale of ownership) is performed between the user A and the user B (S1 shown in the drawing). The user B applies to the battery control device 300 for setting content of a user change or an electric power supply target change for the battery 400 including an battery ID of the battery 400 or information of an electric power supply target of the battery 400 through a terminal device used by the user B (hereinafter referred to as a terminal device TB) or the like (S2). FIG. 9 is an example of content of an application for a change of the user or electric power supply target of the battery 400. As in an image IM2 of FIG. 9, the user B applies to the battery control device 300 for setting content of a user change or an electric power supply target change for the battery 400.

Figure 10:
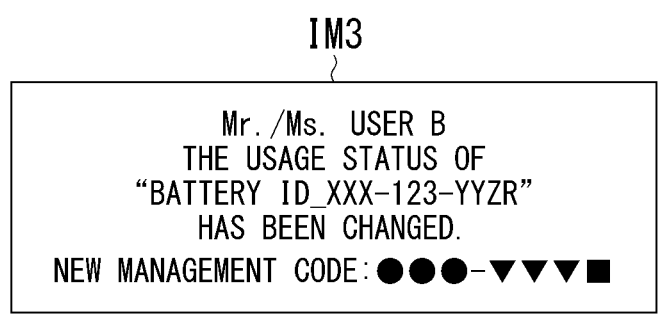
FIG. 10 is a diagram illustrating an example of a completion notification which is received by a terminal device.

Referring back to FIG. 8, the communication unit 310 of the battery control device 300 transmits the change content accepted in S2 to the terminal device TA of the user A who is a registered user of the battery 400 (S3). The user A returns consent to confirmation content accepted in S3 to the battery control device 300 through the terminal device TA (S4). A completion notification is transmitted to the terminal device TB of the user B (S5). In this case, the battery control device 300 may set new management codes for the battery 400 and the user B. FIG. 10 is a diagram illustrating an example of a completion notification which is received by the terminal device TB. The battery control device 300 sets, for example, a new management code for the battery 400 having a battery ID "XXX-123-YYZR," and notifies the user B by displaying an image IM3 on the display unit of the terminal device TB.

The application for a user change in S2 may be performed by the user A who is an original user of the battery 400. In that case, the processes of S3 and S4 may be omitted.

[Process Flow 1]

Figure 11:
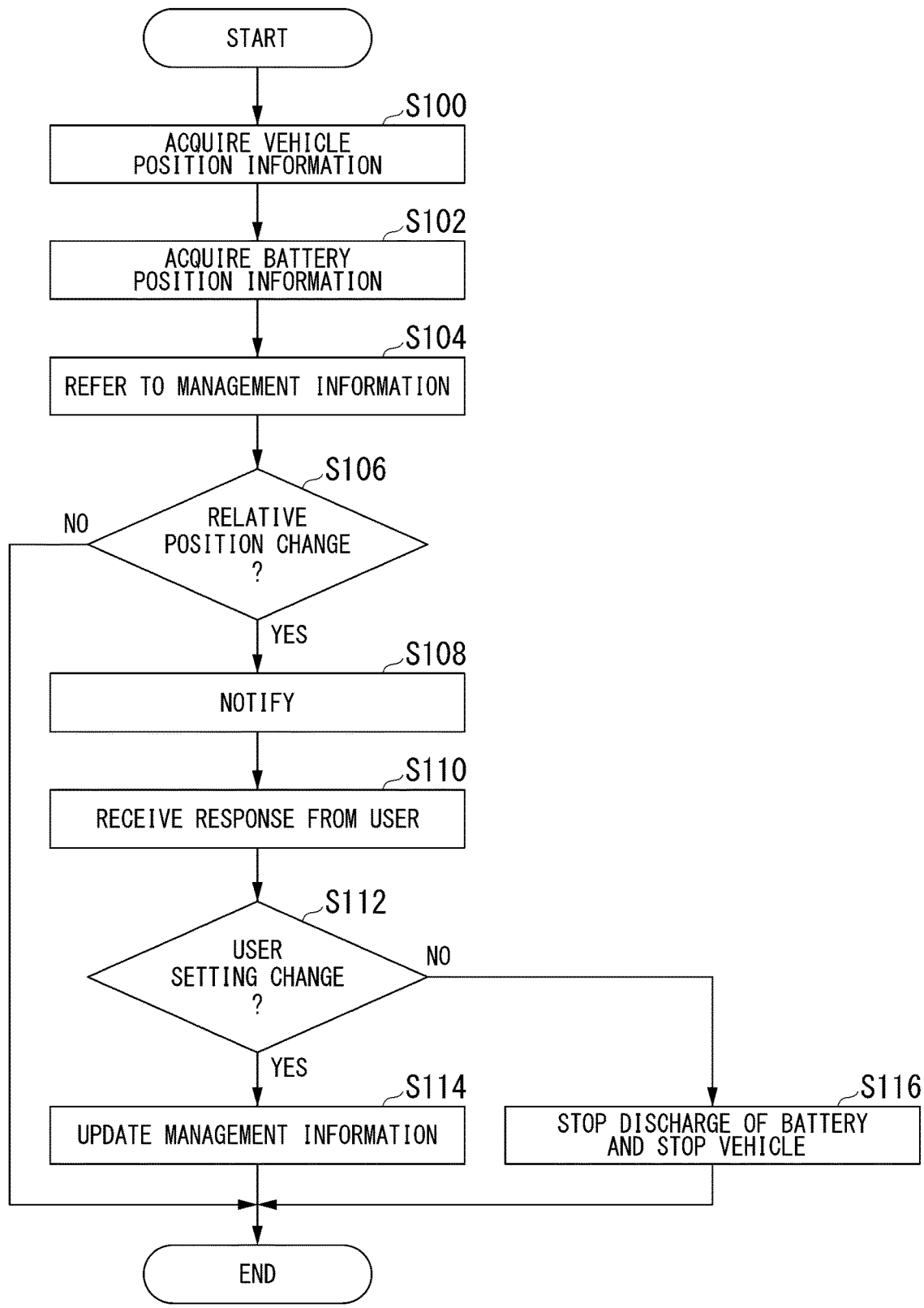
FIG. 11 is a flow chart illustrating an example of a process of management performed by the battery control device in a case where the electric power supply target is a vehicle.

FIG. 11 is a flow chart illustrating an example of a process of management performed by the battery control device 300 in a case where the electric power supply target is the vehicle M.

First, the position information acquisition unit 320 acquires position information of the vehicle M which is an electric power supply target (step S100). Next, the position information acquisition unit 420 acquires position information of the battery 400 (step S102). Next, the determination unit 340 refers to the management information 360 (step S104), compares two pieces of position information acquired in step S100 and step S102, and determines whether the relative positions of the battery 400 and the vehicle M change (step S106). In a case where it is determined that the relative positions do not change, the battery information management unit 330 terminates the process of the present flow chart.

In a case where it is determined that the relative positions change, the notification unit 350 refers to the management information 360 and notifies a registered user (the user A) (step S108). Next, the communication unit 310 receives a response from the user A (step S110).

Next, the determination unit 340 determines whether the response from the user A received in step S110 indicates a change of a user setting (such as, for example, a change of a user or a change of an electric power supply target) (step S112). In a case where the response indicates a change of a user setting, the battery information management unit 330 updates the management information 360 on the basis of the reception result of step S110 (step S114). In a case where the response does not indicate a change of a user setting, the battery information management unit 330 transmits a command for stopping discharge of the battery 400 or stopping the other vehicle ml having the battery 400 mounted therein through the communication unit 310 (step S116). This concludes the process of the present flow chart.

[Multi-Purpose Use of Battery]

The battery control device 300 is not limited to a case where the user of the battery 400 is changed as described above, and acquires and manages the position information of the battery 400, for example, even in a case where the user A removes the battery 400 from the vehicle M and connects the battery to another electric power supply target.

FIG. 12 is a diagram illustrating another example of the management information 360. The management information 360 may include settings of a plurality of electric power supply targets with respect to one the battery 400. For example, in a case where the user A uses the battery 400 in a state in which the battery 400 is removed from the vehicle M and the battery 400 is connected to any of other devices OD1 to OD3 shown in FIG. 1, information corresponding to each of the other devices OD1 to OD3 (for example, use position) is stored in the management information 360, in addition to the information of the vehicle M. The other devices OD1 to OD3 may include a stationary device or an electric-powered moving object.

In a case where it is determined that the battery 400 is not mounted in an electric power supply target assumed by the user of the vehicle M on the basis of the position information of the battery 400 acquired by the position information acquisition unit 420 and the position information of the vehicle M acquired by the position information acquisition unit 320, the battery information management unit 330 refers to the management information 360. In a case it is determined that the battery 400 is used in any of the other devices OD1 to OD3 set in the management information 360 on the basis of the position information of the battery 400 and the position information of the other devices OD1 to OD3, the battery information management unit 330 may not perform control for stopping electric power supply.

Figure 13:
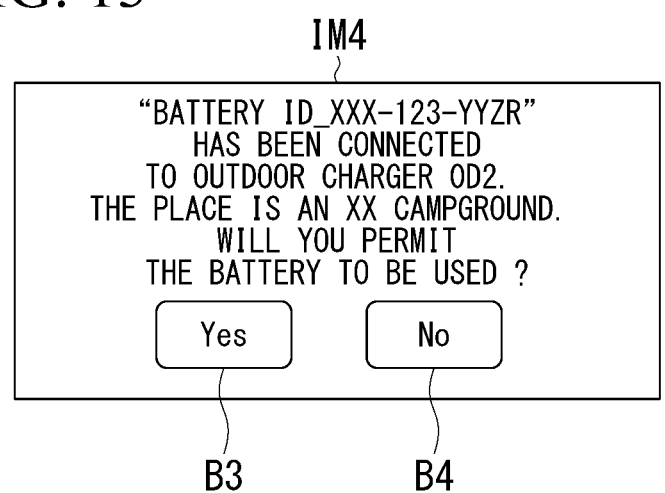
FIG. 13 is a diagram illustrating processing of the battery control device during a change of the electric power supply target.

FIG. 13 is a diagram illustrating processing the battery control device 300 during a change of the electric power supply target. In a case where the determination unit 340 determines that the battery 400 is connected to another device OD2 on the basis of the position information of the battery 400 acquired by the position information acquisition unit 420 through the battery information management unit 330 and the position information of another device OD2 acquired by the position information acquisition unit 320, information is displayed on the display unit of the terminal device TA of the user A, for example, in a form such as an image IM4 of FIG. 13. For example, in a case where the user A removes the battery 400 from the vehicle M and connects the battery to another device OD2, the user A permits another device OD2 to continue to use the battery 400 by pressing a "YES" button B3 in the image IM4.

On the other hand, in a case where the battery 400 is unintentionally connected to another device OD2, the user A does not permit the battery 400 to be used by pressing a "NO" button B4 in the image IM4. In that case, the battery information management unit 330 may transmit a discharge stop signal for stopping electric power supply to the battery 400.

The content of a notification performed by the notification unit 350 may be able to be set in multiple stages in accordance with a warning level. For example, in a case where the user A reconnects the battery 400 to any of the other devices OD1 to OD3 which are set, only simple notification information that does not have the "YES" button B3 and the "NO" button B4 unlike the image IM4 may be set as notification content.

[Process Flow 2]

Figure 14:
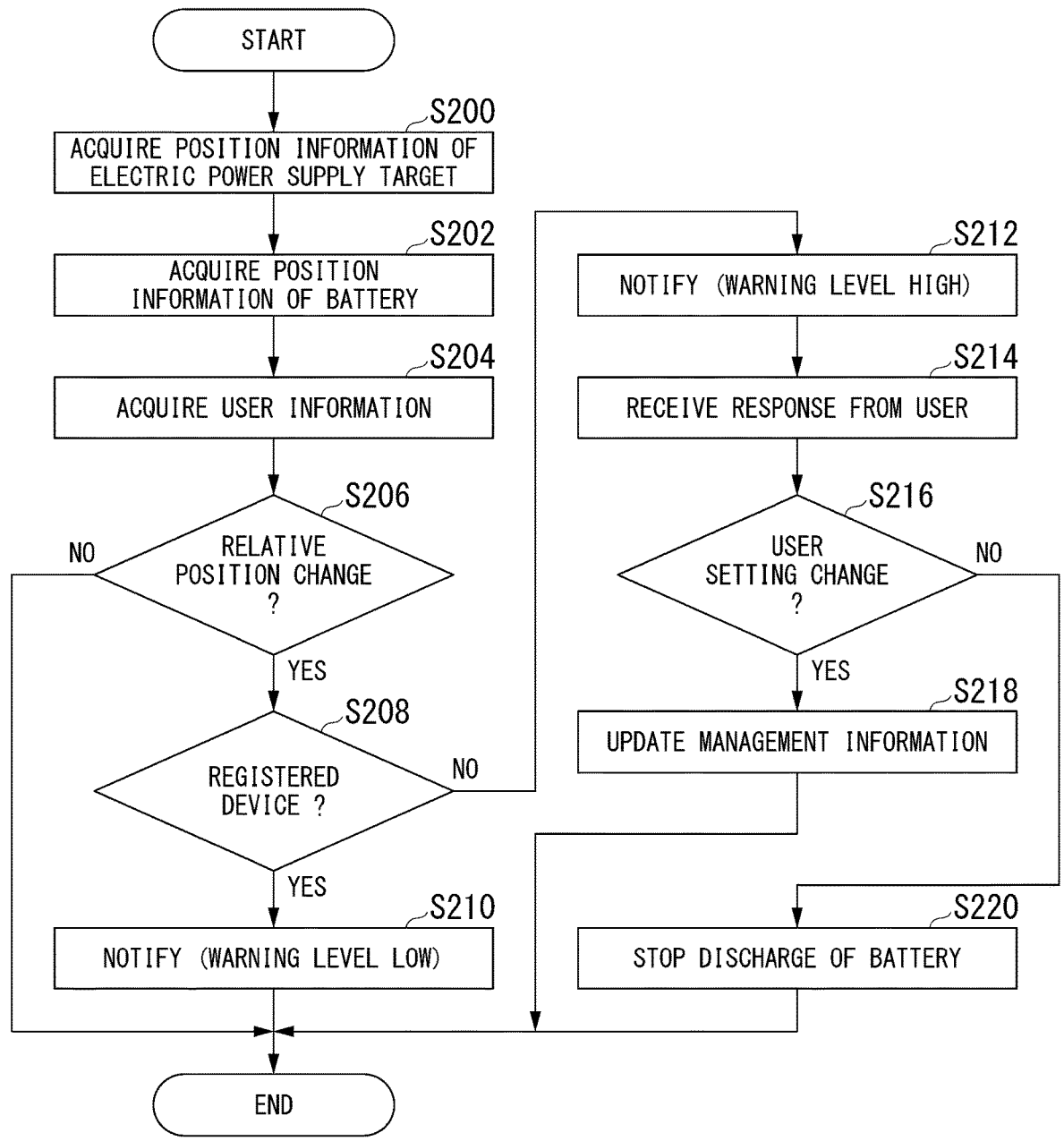
FIG. 14 is a flow chart illustrating another example of a process of management performed by the battery control device.

FIG. 14 is a flow chart illustrating another example of a process of management performed by the battery control device 300.

First, the position information acquisition unit 320 acquires position information of an electric power supply target (step S200). Next, the position information acquisition unit 420 acquires position information of the battery 400 (step S202). Next, the battery information management unit 330 refers to the management information 360 (step S204), compares two pieces of position information acquired in step S200 and step S202, and determines whether the relative positions of the battery 400 and the electric power supply target changes (step S206). In a case where it is not determined that the relative positions change, the battery information management unit 330 terminates the process of the present flow chart.

In a case where it is determined that the relative positions change, the battery information management unit 330 refers to a setting of another device that uses the same battery 400 of the management information 360, and determines whether another device in which the battery 400 is presumed to be connected on the basis of the position information is a registered device (step S208). In a case where it is a registered device, the notification unit 350 notifies the user A of a notification indicating that there has been reconnection (a warning level is low) (step S210). In a case where it is not a registered device, the notification unit 350 notifies the user A of a notification indicating that there has been reconnection (a warning level is high) (step S212). Next, the communication unit 310 receives a response from the user A (step S214).

Next, the battery information management unit 330 determines whether a response from the user A received in step S214 indicates a change of a user setting (or a change of an electric power supply target) (step S216). In a case where the response indicates a change of a user setting, the battery information management unit 330 updates the management information 360 on the basis of the reception result of step S214 (step S218). In a case where the response does not indicate a change of a user setting, the battery information management unit 330 transmits a command for stopping discharge of the battery 400 through the communication unit 310 (step S220). This concludes the process of the present flow chart.

In the battery control device 300 of the embodiment described above, the determination unit 340 determines whether there is a change in a relative relationship between the position information acquired by the position information acquisition unit 320 and the position information acquired by the position information acquisition unit 420, in a case where it is determined that there is a change in the relative relationship, the battery 400 is estimated not to be mounted in an electric power supply target assumed by the user of the vehicle M which is an electric power supply target and then the notification unit 350 notifies the user of the vehicle M, and the battery control device performs control for permitting supply of electric power to the electric power supply target by the battery 400 or stopping supply of power to a vehicle which is an electric power supply target, whereby it is possible to suitably manage the multi-purpose usable battery 400.

The above-described embodiment can be represented as follows.

A battery control device including:
a storage device having a program stored therein; and
a hardware processor,
wherein the hardware processor executes the program stored in the storage, to thereby
acquire geographical position information of a battery registered as being mounted in an electric power supply target,
acquire geographical position information of the electric power supply target having the battery mounted therein,
determine whether a change has occurred in a relative relationship between the geographical position information of the battery and the geographical position information of the electric power supply target, and
stop the electric power supply target having the battery mounted therein in a case where it is determined that a change has occurred in the relative relationship.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A control device comprising:
    a first acquisition unit configured to acquire geographical position information of a battery registered as being mounted in an electric power supply target;
    a second acquisition unit configured to acquire geographical position information of the electric power supply target having the battery mounted therein;
    a determination unit configured to determine whether a change has occurred in a relative relationship between the geographical position information of the battery acquired by the first acquisition unit and the geographical position information of the electric power supply target acquired by the second acquisition unit;
    a coping unit configured to stop supply of power to the electric power supply target having the battery mounted therein in a case where it is determined by the determination unit that a change has occurred in the relative relationship;
    a communication unit configured to communicate with an external device;
    a notification unit configured to notify a user of the electric power supply target in a case where it is determined by the determination unit that a change has occurred in the relative relationship; and
    a management unit configured to manage a combination of the battery and the electric power supply target to be determined by the determination unit and the electric power supply target,
    wherein, in a case where a user of the battery is changed, the management unit accepts a setting change for the user of the battery, and
    in a case where the setting change for the user of the battery is accepted by the management unit, the notification unit notifies at least a user of a new battery that the setting change is completed.

2. The control device according to claim 1, wherein, in a case where the management unit accepts the setting change for the user of the battery, and the coping unit stops supply of power to the electric power supply target having the battery mounted therein, the coping unit releases a stop state of supply of power to the electric power supply target having the battery mounted therein.

3. The control device according to claim 1, wherein the battery is provided with a battery ECU configured to enable electric power supply stop control of the battery and be capable of communicating with the external device, and
    in a case where the management unit does not accept the setting change for the user of the battery, and it is determined by the determination unit that a change has occurred in the relative relationship, the coping unit causes the communication unit to transmit a command for performing electric power supply stop control of the battery to the battery ECU.

4. The control device according to claim 3, wherein, in a case where the management unit accepts the setting change for the user of the battery, and transmits the command for performing electric power supply stop control of the battery to the battery ECU, the communication unit transmits a command for releasing electric power supply stop control of the battery to the battery ECU.

5. The control device according to claim 1, wherein, in a case where the determination unit determines that a change has occurred in the relative relationship, and the battery is replaced from the electric power supply target to another device used by the user of the battery, the notification unit notifies the user of the electric power supply target that the battery is replaced.

6. The control device according to claim 1, wherein, in a case where the electric power supply target is a vehicle, the coping unit stops the vehicle having the battery mounted therein in a case where it is determined by the determination unit that a change has occurred in the relative relationship.

7. A control method comprising causing a computer to:
acquire geographical position information of a battery registered as being mounted in an electric power supply target;
acquire geographical position information of the electric power supply target having the battery mounted therein;
determine whether a change has occurred in a relative relationship between the geographical position information of the battery and the geographical position information of the electric power supply target;
stop supply of power to the electric power supply target having the battery mounted therein in a case where it is determined that a change has occurred in the relative relationship;
communicate with an external device;
notify a user of the electric power supply target in a case where it is determined by the determination unit that a change has occurred in the relative relationship; and
manage a combination of the battery and the electric power supply target to be determined by the determination unit and the electric power supply target,
wherein, in a case where a user of the battery is changed, accept a setting change for the user of the battery, and
in a case where the setting change for the user of the battery is accepted, notify at least a user of a new battery that the setting change is completed.

8. A computer readable non-transitory storage medium having a program stored therein, the program causing the computer to:
acquire geographical position information of a battery registered as being mounted in an electric power supply target;
acquire geographical position information of the electric power supply target having the battery mounted therein;
determine whether a change has occurred in a relative relationship between the geographical position information of the battery and the geographical position information of the electric power supply target;
stop the electric power supply target having the battery mounted therein in a case where it is determined that a change has occurred in the relative relationship;
communicate with an external device;
notify a user of the electric power supply target in a case where it is determined by the determination unit that a change has occurred in the relative relationship; and
manage a combination of the battery and the electric power supply target to be determined by the determination unit and the electric power supply target,
wherein, in a case where a user of the battery is changed, accept a setting change for the user of the battery, and
in a case where the setting change for the user of the battery is accepted, notify at least a user of a new battery that the setting change is completed.

* * * * *